(12) United States Patent
Jeon et al.

(10) Patent No.: US 9,785,591 B2
(45) Date of Patent: Oct. 10, 2017

(54) SMARTCARD INTERFACE CONVERSION DEVICE, EMBEDDED SYSTEM HAVING THE SAME DEVICE AND METHOD FOR TRANSFERRING DATA SIGNAL USED IN THE SAME DEVICE

(71) Applicant: Electronics and Telecommunications Research Institute, Daejeon (KR)

(72) Inventors: Yong-Sung Jeon, Daejeon (KR);
Young-Sae Kim, Daejeon (KR);
Jeong-Nyeo Kim, Daejeon (KR);
Seung-Yong Yoon, Daejeon (KR);
Hong-Il Ju, Daejeon (KR); Hyun-Sook Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 656 days.

(21) Appl. No.: 14/243,089

(22) Filed: Apr. 2, 2014

(65) Prior Publication Data

US 2015/0106648 A1   Apr. 16, 2015

(30) Foreign Application Priority Data

Oct. 14, 2013 (KR) .................. 10-2013-0122129

(51) Int. Cl.
*G06F 1/04* (2006.01)
*G06F 1/24* (2006.01)
*G06F 13/38* (2006.01)

(52) U.S. Cl.
CPC ........ *G06F 13/385* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS 5,790,885 A  *  8/1998  Shona ................ G06K 17/0022
                                                          710/5
8,769,160 B2    7/2014  Park et al.
(Continued)

FOREIGN PATENT DOCUMENTS

| KR | 10-2005-0008130 | 1/2005 |
|----|-----------------|--------|
| KR | 10-2001-0063909 | 9/2011 |
| KR | 10-2012-0070372 | 6/2012 |

*Primary Examiner* — Idriss N Alrobaye
*Assistant Examiner* — Dayton Lewis-Taylor
(74) *Attorney, Agent, or Firm* — Staas & Halsey LLP

(57) ABSTRACT

The present invention relates to an apparatus and a method for transferring a data signal between a smartcard interface and an interface of a processor within an embedded system. According to an exemplary embodiment of the present invention, an interface conversion device communicating between a processor and a smartcard IC chip includes: an input/output signal conversion logic configured to transfer a signal between a first interface of the processor and a second interface of the smartcard IC chip; a clock generator configured to generate a clock signal driving the smartcard IC chip depending on a first control signal received from the processor and provide the generated clock signal to the smartcard IC chip; and a reset controller configured to generate a reset signal depending on a second control signal received from the processor and provide the generated reset signal to the smartcard IC chip.

13 Claims, 6 Drawing Sheets

(56) References Cited

U.S. PATENT DOCUMENTS

2005/0077355 A1\* 4/2005 Yamamoto ............ G06F 13/385
  235/439
2011/0016310 A1\* 1/2011 Yong ....................... G06F 21/57
  713/155

\* cited by examiner

SMARTCARD INTERFACE CONVERSION DEVICE, EMBEDDED SYSTEM HAVING THE SAME DEVICE AND METHOD FOR TRANSFERRING DATA SIGNAL USED IN THE SAME DEVICE

CROSS REFERENCE TO RELATED APPLICATION

This application claims the benefit of Korean Patent Application No. 10-2013-0122129, filed on Oct. 14, 2013, entitled "Smartcard Interface Conversion Device, Embedded System Having The Same Device And Method For Transferring Data Signal Used In The Same Device", which is hereby incorporated by reference in its entirety into this application.

BACKGROUND OF THE INVENTION

1. Technical Field

The present invention relates to an interface conversion device and method, and more particularly, to an interface conversion device, an embedded system having the same, and a method for transferring a data signal used in the same device capable of transferring a data signal between a smartcard interface and an interface of a processor within the embedded system.

2. Description of the Related Art

A mobile terminal which is a representative type of an embedded system is equipped with various smart cards, such as a universal subscriber identification module (USIM) card, a user identification module (UIM), and a subscriber identification module (SIM), for user authentication. Further, a universal integrated circuit card (UICC) equipped with various service applications, such as banking, securities, and electronic money, in addition to the user authentication has been frequently used as a new type of smart card. The UICC uses a smartcard IC chip to ensure security which is the most important factor, in which the smartcard IC chip has excellent security enough to satisfy a physical security level.

Generally, the smartcard IC chip is inserted into a slot within the embedded system (for example, mobile terminal) to perform data communication with a processor within the embedded system (hereinafter, 'embedded processor') for user authentication, and the like. The smartcard IC chip performs the data communication in half-duplex based on an ISO 7816 interface which is specified as a standard of a contact type card.

Therefore, in order for the smartcard IC chip to communicate with the embedded processor through various interfaces, such as UART, SPI, and I2C, in addition to the ISO 7816 interface, a need exists for a device and a method for converting a signal between the ISO 7816 interface of the smartcard and the interface of the embedded processor.

SUMMARY OF THE INVENTION

The present invention has been made in an effort to provide an interface conversion device and method to convert a signal input and output through a smartcard interface into a signal which may be input and output through an interface of an embedded processor.

Further, the present invention has been made in an effort to provide an interface conversion device and method to convert a signal input and output through a smartcard interface into a signal which may be input and output through an interface of an embedded processor depending on a control of the embedded processor, while minimizing power consumption.

In addition, the present invention has been made in an effort to provide an interface conversion device and method to convert a half-duplex signal which is input and output through a smartcard interface into a full-duplex signal which may be input and output through an interface of an embedded processor depending on a control of the embedded processor, while minimizing power consumption.

According to an exemplary embodiment of the present invention, there is provided an interface conversion device communicating between a processor and a smartcard IC chip, including: an input/output signal conversion logic configured to transfer a signal between a first interface of the processor and a second interface of the smartcard IC chip; a clock generator configured to generate a clock signal driving the smartcard IC chip depending on a first control signal received from the processor and provide the generated clock signal to the smartcard IC chip; and a reset controller configured to generate a reset signal depending on a second control signal received from the processor and provide the generated reset signal to the smartcard IC chip.

The first interface may be a full-duplex universal asynchronous receiver transmitter interface.

The second interface may be a half-duplex asynchronous receiver transmitter interface.

The first and second control signals may be received through a universal input/output signal line of the processor.

The clock generator may be activated or inactivated depending on the first control signal.

The clock signal generated by the clock generator may be provided as a reference clock of the input/output signal conversion logic.

The processor may control the smartcard IC chip using the first and second control signals.

The input/output signal conversion logic may include an input terminal and an output terminal connected to the first interface of the processor and an input/output common terminal connected to the second interface of the smartcard IC chip.

The input/output signal conversion logic may keep a logical value of the input terminal and the output terminal connected to the first interface of the processor and a logical value of the input/output common terminal connected to the second interface of the smartcard IC chip in '1' and when the logical value of the terminal connected to any one of the interfaces is '0', may transfer the logical value to the terminal connected to the other interface.

The input/output signal conversion logic may output the logical value '1' to the input/output common terminal connected to the second interface of the smartcard IC chip when the logical value '0' is input to the input terminal connected to the first interface of the processor and may output a logical value 'Z' state to the input/output common terminal connected to the second interface when the logical value '1' is input to the input terminal connected to the first interface.

The input/output signal conversion logic may output the logical value '1' to the output terminal connected to the first interface of the processor when the logical value of the input/output common terminal connected to the second interface of the smartcard IC chip is '1'.

The input/output signal conversion logic may test the logical value of the input terminal connected to the first interface when the logical value of the input/output common terminal connected to the second interface of the smartcard IC chip is '0', output the logical value '1' to the output terminal connected to the first interface when the logical value of the input terminal is '0', and output the logical value '0' to the output terminal connected to the first interface when the logical value of the input terminal is '1'.

According to another exemplary embodiment of the present invention, there is provided an embedded system, including: a processor configured to include a full-duplex first interface; a slot configured to be equipped with a smartcard IC chip including a half-duplex second interface; and an interface conversion chip configured to transfer a data signal between the first interface of the processor and the second interface of the smartcard IC chip equipped in the slot and generate at least one of a clock signal and a reset signal for controlling an operation of the smartcard IC chip under a control of the processor.

According to still another exemplary embodiment of the present invention, there is provided a method for transferring a data signal between a full-duplex first interface and a half-duplex second interface, the method including; outputting a logical value '0' to an input/output common terminal connected to the second interface when a logical value '0' is input to an input terminal connected to the first interface; and outputting a logical value 'Z' state to the input/output common terminal connected to the second interface when a logical value '1' is input to the input terminal connected to the first interface.

The method for transferring a data signal between a full-duplex first interface and a half-duplex second interface may further include: outputting the logical value '1' to an output terminal connected to the first interface of the processor when the logical value of the input/output common terminal connected to the second interface is '1'.

The method for transferring a data signal between a full-duplex first interface and a half-duplex second interface may further include: testing the logical value of the input terminal connected to the first interface when the logical value of the input/output common terminal connected to the second interface is '0'; outputting the logical value '1' to the output terminal connected to the first interface when the logical value of the input terminal is '0'; and outputting the logical value '0' to the output terminal connected to the first interface when the logical value of the input terminal is '1'.

DESCRIPTION OF EXEMPLARY EMBODIMENTS

The present invention may be variously modified and have several exemplary embodiments. Therefore, specific exemplary embodiments of the present invention will be illustrated in the accompanying drawings and be described in detail in the present specification. However, it is to be understood that the present invention is not limited to a specific exemplary embodiment, but includes all modifications, equivalents, and substitutions without departing from the scope and spirit of the present invention.

Further, when it is determined that the detailed description of the known art related to the present invention may obscure the gist of the present invention, the detailed description thereof will be omitted.

A singular form used in the present description and the following claims is to be interpreted to generally mean "one or more" unless mentioned to the contrary.

Further, "module", "part", "interface", and the like, among terms used in the present specification generally means computer-related objects, for example, hardware, software, and a combination thereof.

Figure 1:
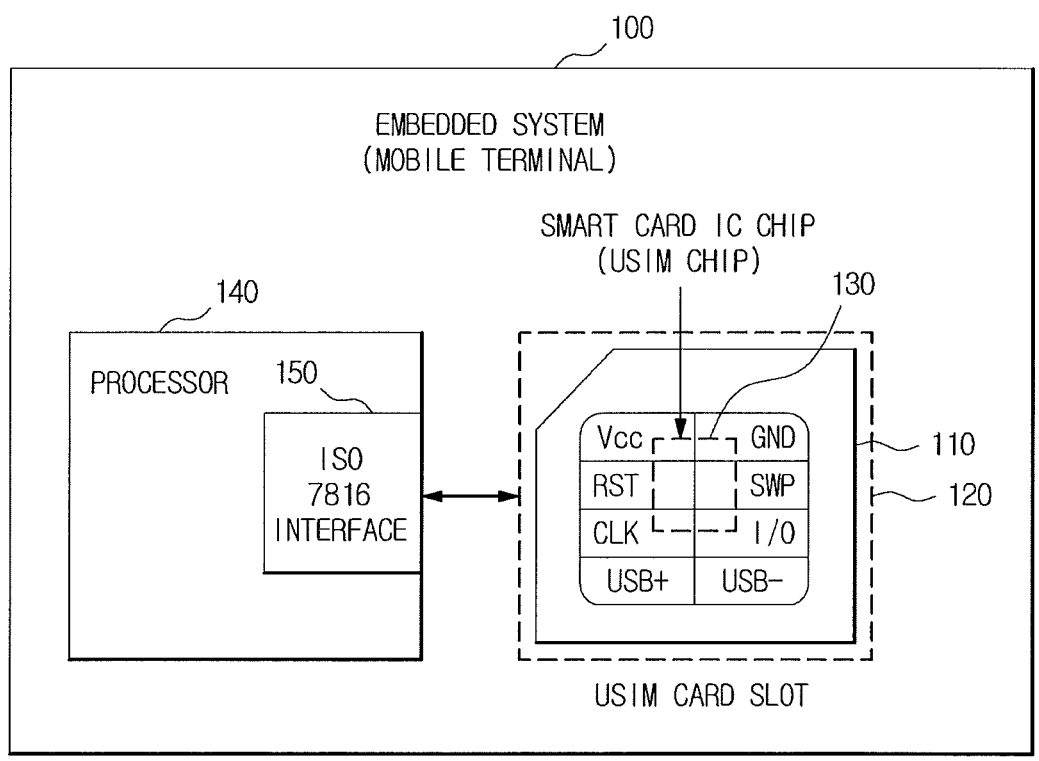
FIG. 1 is a diagram schematically illustrating a structure in which a smartcard IC chip equipped in an embedded system communicates with an embedded processor.

First, prior to describing exemplary embodiments of the present invention, a general structure in which an embedded processor and a smart card IC chip within an embedded system are connected to each other will be described with reference to FIGS. 1 and 2. FIG. 1 is a diagram schematically illustrating a structure in which a smartcard IC chip equipped in an embedded system communicates with an embedded processor.

As illustrated in FIG. 1, a smartcard (USIM card) 110 is inserted into a slot 120 of an embedded system (for example, mobile terminal) 100 and thus communicates with an embedded processor 140. A smartcard IC chip 130 includes eight signal terminals (Vcc, GND, reset, SWP, clock, I/O, USB+, and USB−) which are an ISO7816 interface. However, most of the smartcard IC chips do not actually use the USB+ and USB− signals due to a power problem. A data input and output between the embedded processor 140 and the smartcard IC chip 130 is performed by mainly using a half-duplex data input/output terminal (I/O terminal).

The embedded processor 140 needs to include an ISO7816 interface 150, which is a standard interface of a smartcard, to communicate with the smartcard 110. However, when the embedded processor 140 does not include the ISO7816 interface or when the embedded processor 140 is previously connected to another USIM card for a user authentication function even though the embedded processor 140 has the ISO7816 interface, another method for connecting the smartcard IC chip to the embedded processor is required. In other words, in the case of using the separate smartcard IC chip to improve security of the embedded system, there is a need to connect the smartcard IC chip to the embedded processor using another standard interface of the embedded processor 140. For example, the smartcard IC chip may be connected to the embedded processor using a standard interface, such as UART, SPI, and I2C, of the embedded processor 140. Therefore, in this case, a device for converting signals input and output through these standard interfaces into signals input and output through the ISO7816 interface of the smartcard IC chip is required.

Figure 2:
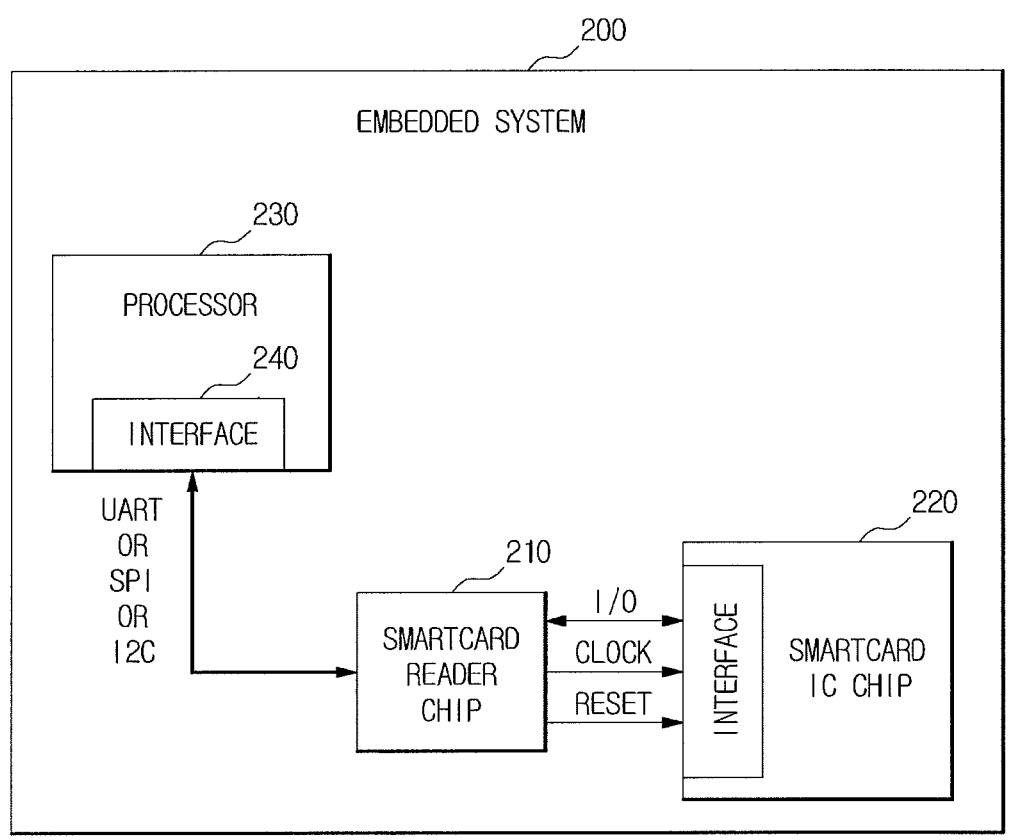
FIG. 2 is a diagram illustrating a configuration in which an embedded processor and the smartcard IC chip within the embedded system are connected to each other by using a smartcard reader chip.

FIG. 2 illustrates a configuration in which the embedded processor and the smartcard IC chip within the embedded system are connected to each by using a smartcard reader chip. As illustrated in FIG. 2, when an embedded processor 230 and a smartcard IC chip 220 are connected to each other using a smartcard reader chip 210, the smartcard reader chip 210 directly controls all the signals of a smartcard IC chip 220 and is connected to an embedded processor 230 through an interface 240, such as UART, SPI, and I2C.

The smartcard reader chip 210 includes a separate processor (not illustrated) and a memory (not illustrated) for connecting between the embedded processor 230 and the smartcard IC chip 220. For example, when the embedded processor 230 transfers a signal to the smartcard IC chip 220, a processor (not illustrated) in the smartcard reader chip 210 stores the corresponding signal value in an internal memory of the smartcard reader chip 210 in a byte unit and then converts the corresponding signal value into a signal type again and transfers the converted signal type to the smartcard IC chip 220. As described above, since the processor, the memory, and the like are included in the smartcard reader chip 210, power consumption becomes large. Generally, the power consumption of the smartcard reader chip is larger than that of the smartcard IC chip.

Further, even when the embedded processor 230 changes an operation state of the smartcard IC chip 220, for example, resetting the smartcard IC chip 220 or changing a baud rate which is an input/output communication rate, the embedded processor 230 may not directly control the smartcard reader chip 210 but can transfer predefined command languages corresponding to each function through the input/output interface 240 and allow the smartcard reader chip 210 to adjust the operation state of the smartcard IC chip 220 depending on the predefined command languages.

Therefore, the exemplary embodiment of the present invention proposes the connection between the embedded processor and the smartcard IC chip by the method of enabling the embedded processor to directly control the operation of the smartcard IC chip while minimizing the power consumption.

Hereinafter, the connection method between the embedded processor and the smartcard IC chip according to the exemplary embodiment of the present invention will be described with reference to FIGS. 3 to 6.

Figure 3:
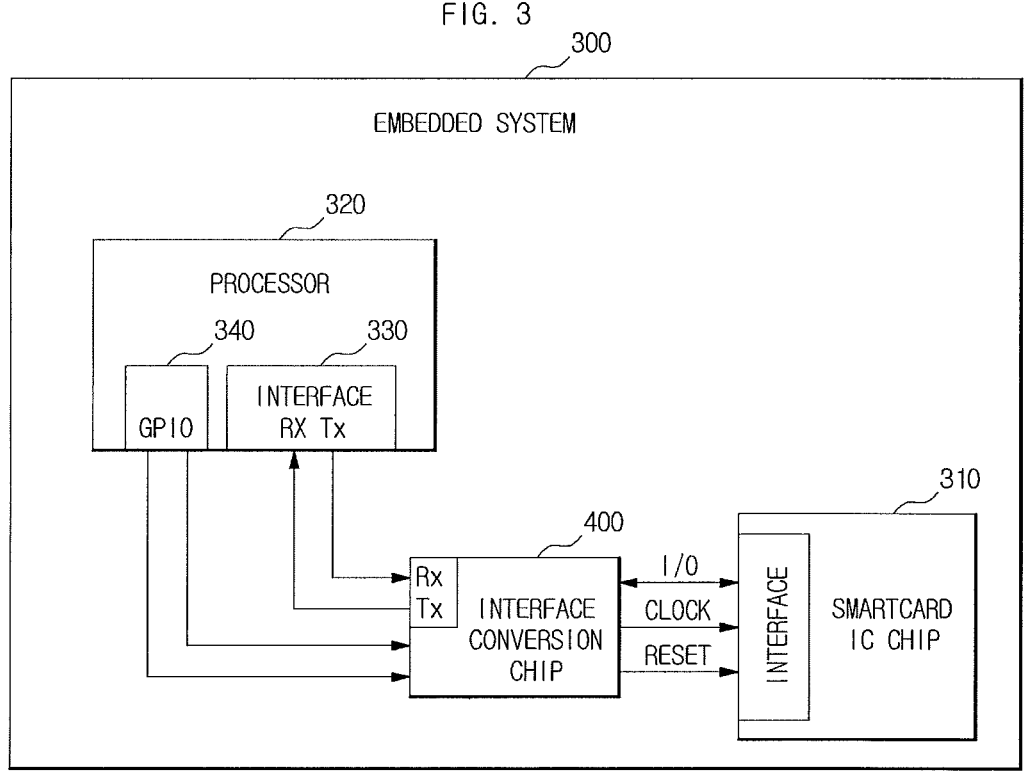
FIG. 3 is a diagram illustrating a configuration in which the embedded processor and the smartcard IC chip are connected to each other by using an interface conversion device according to an exemplary embodiment of the present invention.

FIG. 3 is a diagram illustrating the configuration in which the embedded processor and the smartcard IC chip are connected to each other by using the interface conversion device according to the exemplary embodiment of the present invention.

An interface conversion device 400 serves to connect a smartcard IC chip 310 to the embedded processor 320 in a general embedded system 300.

According to the exemplary embodiment of the present invention, the interface conversion device 400 is implemented in a chip type and may be mounted in the embedded system 300. The interface conversion device 400 serves to convert a data signal which may be input to and output from the smartcard IC chip 310 through the interface included in the embedded processor 320. According to the exemplary embodiment of the present invention, the interface conversion device 400 may convert a half-duplex data input/output signal depending on the standard interface of the smartcard IC chip into a full-duplex universal asynchronous receiver transmitter (UART) signal in real time and transfer the full-duplex UART signal to the embedded processor 320.

Further, the interface conversion device 400 does not include a separate processor and a memory. Instead, the interface conversion device 400 generates a clock and reset signal for operating the smartcard IC chip 310 under the control of the embedded processor 320 and transfers the generated clock and reset signal to the smartcard IC chip 310, such that the embedded processor 320 may directly control the smartcard IC chip 310.

Figure 4:
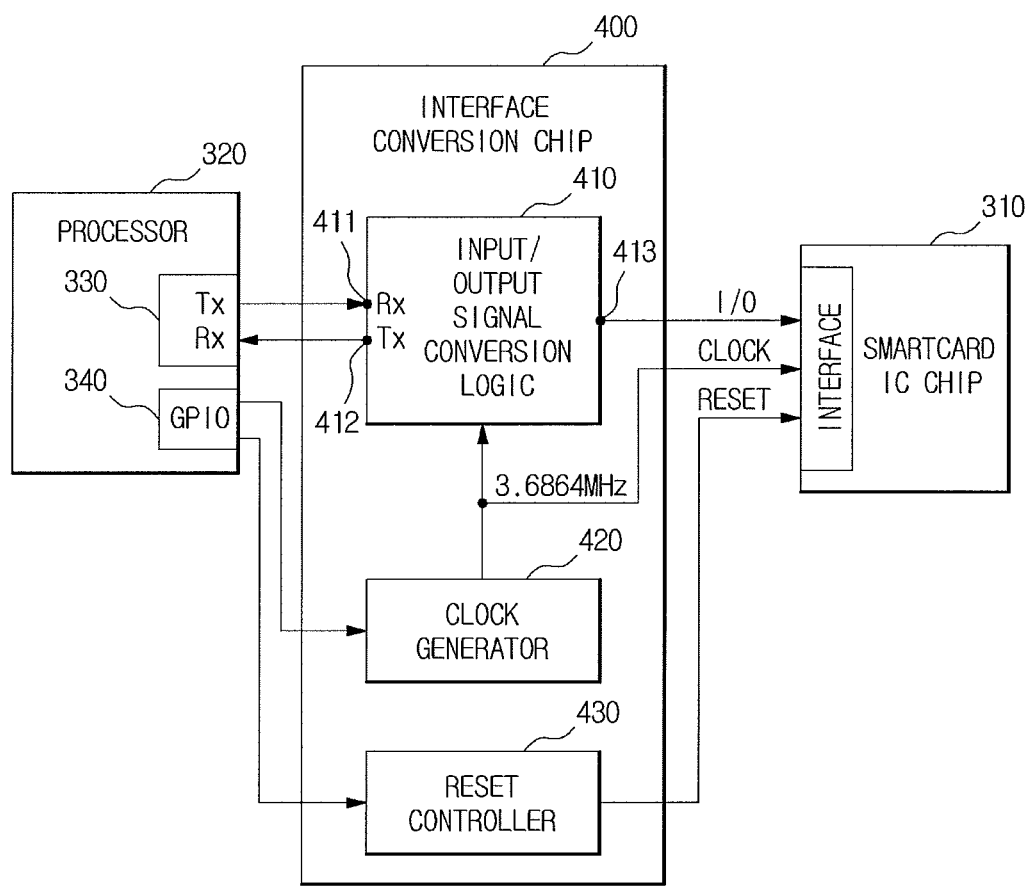
FIG. 4 is an internal configuration diagram of an interface conversion device according to an exemplary embodiment of the present invention.

FIG. 4 is a diagram illustrating in more detail an internal configuration of the interface conversion device according to the exemplary embodiment of the present invention. As illustrated in FIG. 4, the interface conversion device 400 includes an input/output signal conversion logic 410, a clock generator 420, and a reset controller 430.

The input/output signal conversion logic 410 serves to transfer a signal between an interface 330 included in the embedded processor 320 and the interface of the smartcard IC chip 310. That is, the input/output signal conversion logic 410 serves to transfer a data signal output through the interface 330 included in the embedded processor to an input/output terminal included in the smartcard IC chip 310 or transfer the signal output from the input/output terminal of the smartcard IC chip 310 to the interface 330 of the processor 320.

According to the exemplary embodiment of the present invention, the interface included in the embedded processor is the full-duplex universal asynchronous receiver transmitter (UART) interface 330 in which an input terminal (Rx) and an output terminal (Tx) are separated from each other.

According to the exemplary embodiment of the present invention, the smartcard IC chip is the half-duplex asynchronous receiver transmitter interface.

According to the exemplary embodiment of the present invention, the input/output signal conversion logic 410 transfers a signal by determining only the logic state (logic '1' or '0') of the input signal without having the separate processor embedded therein.

According to the exemplary embodiment of the present invention, the input/output signal conversion logic 410 may include an input terminal (Rx) 411 and an output terminal (Tx) 412 connected to the interface of the processor and an input/output command terminal 413 connected to the interface of the smartcard IC chip.

According to the exemplary embodiment of the present invention, the input/output signal conversion logic 410 keeps a logical value of the input terminal (Rx) 411 and the output terminal (Tx) 412 connected to the interface of the embedded processor and a logical value of the input/output common terminal 413 connected to the interface of the smartcard IC chip in '1' and when the logical value of the terminal connected to any one of the interfaces is '0', may transfer the corresponding logical value to the terminal connected to the other interface. An operation principle of the input/output signal conversion logic 410 will be described with reference to FIGS. 5 and 6.

The clock generator 420 generates the clock signal which drives the smartcard IC chip 310 depending on the control signal received from the processor 320 and transfers the generated clock signal to the smartcard IC chip 310. Further, the clock generated from the clock generator 420 is internally input to the input/output signal conversion logic 410 and thus may be used as a reference clock for generating the UART signal. According to the exemplary embodiment of the present invention, a clock frequency is generally 3.6864 MHz.

Further, the clock generator 420 may be controlled by the embedded processor 320 so that the operation of the clock generator 420 may be activated or deactivated and therefore when the clock generator 420 is not used, the power consumption may be minimized by stopping the operation of the clock generator 420.

According to the exemplary embodiment of the present invention, the signal used to control the clock generator 420 may be provided through a general purpose input/output (GPIO) 340 of the embedded processor 320. As described above, the embedded processor 320 may directly control the clock signal of the smartcard IC chip 310 by using the clock generator 420 in the interface conversion chip 400.

The reset controller 430 may generate the reset signal depending on the control signal received from the embedded processor 320 and transfer the generated reset signal to the smartcard IC chip 310. The reset controller 430 may generate the reset signal required by the smartcard IC chip 310 by using the signal received from the embedded processor 320 and perform a control to make a reset period be a sufficient time. The signal input to the reset controller 430 may be provided through a general input/output (GPIO) 340 of the embedded processor 320. As described above, the embedded processor 320 may directly control the reset signal of the smartcard IC chip 310 by using the reset controller 430 in the interface conversion chip 400.

Figure 5:
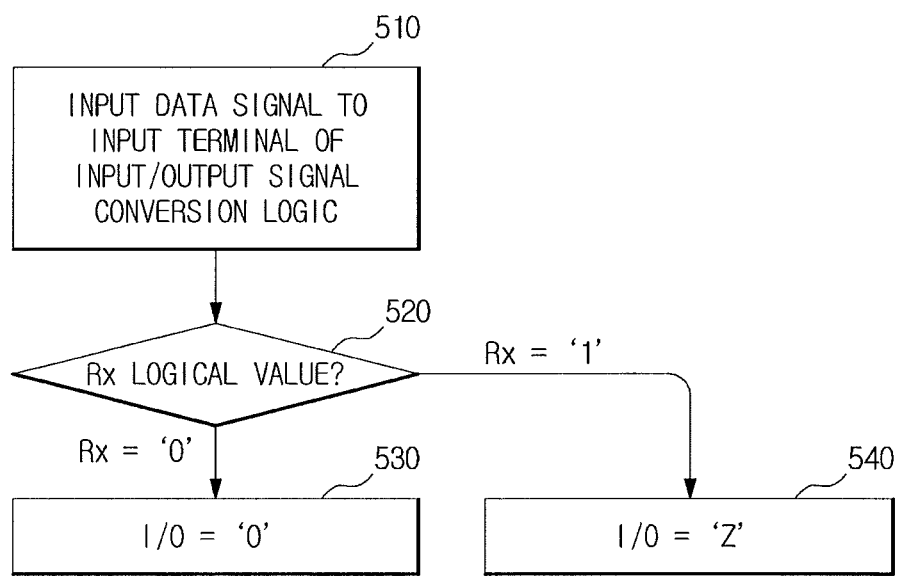
FIG. 5 is a flow chart illustrating a method for converting an output signal of an embedded processor into an input/output signal of the smartcard IC chip according to an exemplary embodiment of the present invention.

FIG. 5 is a flow chart illustrating a method for allowing the interface conversion device to convert the output signal of the embedded processor into the input and output signal of the smartcard IC chip according to an exemplary embodiment of the present invention.

When the data signal is input to the input terminal (Rx) of the input/output signal conversion logic (step S510), the logical value of the input data signal is confirmed (step S520). As the confirmation result, when the logical value is '0', the logical value '0' is output to the input/output common terminal connected to the smartcard interface (step S530).

On the other hand, if it is confirmed that the logical value of the input terminal (Rx) is '1', a logical value 'Z' state, that is, a high impedance state is output to the input/output common terminal connected to the smartcard interface (step S540). Since an I/O line between the input/output signal conversion logic and the smartcard IC chip is pulled-up in the state in which the logic 'Z' is output to the input/output common terminal of the input/output conversion logic, the input of the smartcard IC chip is in a logic '1' state and the output of the smartcard IC chip may be transferred to the input/output signal conversion logic.

Figure 6:
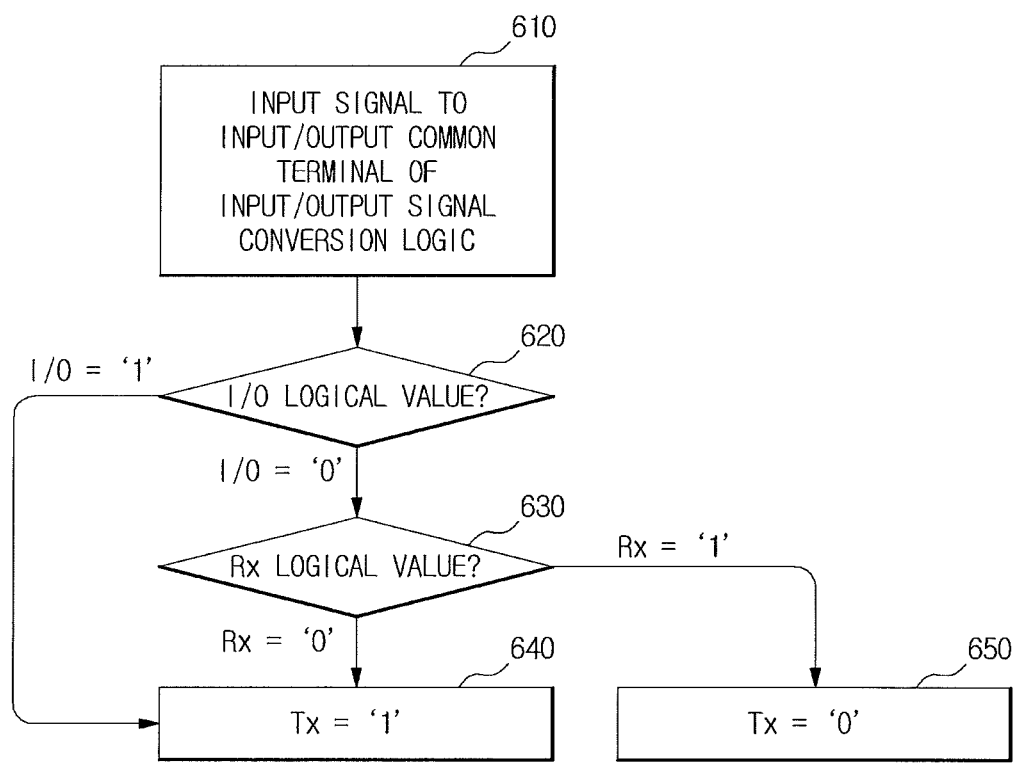
FIG. 6 is a flow chart illustrating a method for converting an input/output signal of a smartcard into an input signal of an embedded processor according to an exemplary embodiment of the present invention.

FIG. 6 is a flow chart illustrating a method for allowing the interface conversion device to convert the input and output signal of the smartcard into the input signal of the embedded processor according to the exemplary embodiment of the present invention.

When the data signal is input to the input/output common terminal of the input/output signal conversion logic (step S610), the logical value of the input data signal is confirmed (step S620). As the confirmation result, when the logical value of the input/output common terminal is '1', the logical value '1' is output to the output (Tx) terminal of the input/output signal conversion logic (step S630).

Meanwhile, as the confirmation result of the logical value of the input/output common terminal of the input/output signal conversion logic, when the logical value is '0', the logical value of the input terminal (Rx) of the input/output signal conversion logic connected to the interface of the processor is confirmed (step S630).

When the logical value of the input terminal (Rx) is '0' (step S650), the logical value '1' is output to the output terminal (Tx) (step S640) and when the logical value of the Rx terminal is '1', the logical value '0' is output to the Tx terminal (step S650).

Since the case in which the logical value of the input/output common terminal of the input/output signal conversion logic is '0' and the logical value of the input terminal (Rx) is '0' corresponds to the case in which the signal of the input terminal (Rx) is transferred to the input/output common terminal as described with reference to FIG. 5, the output of the output terminal (Tx) is output as the logical value '1' so as to prevent the data signal input from the input terminal (Rx) from feeding-back to the output terminal (Tx). Meanwhile, since the case in which the logical value of the input terminal (Rx) is '1' and the logical value of the input/output common terminal is '0' corresponds to the state in which the data signal is output from the smartcard IC chip, the logical value '0' input to the input/output common terminal is transferred to the output terminal (Tx). That is, the logical value '0' is output to the output terminal (Tx).

As described above, according to the exemplary embodiments of the present invention, it is possible to smoothly perform the data communication between the smartcard and the embedded processor by adding only the interface conversion device to the embedded system while holding the existing smartcard IC chip type as it is. Therefore, the USIM of the existing mobile terminal or the smartcard IC chip used in the credit card may be used as a chipset for security of various embedded devices, such as household equipment (for example, a smart TV, a refrigerator, a robot cleaner) and a set top box.

Further, according to the exemplary embodiments of the present invention, since the interface conversion device does not include the separate processor, it is possible to reduce the power consumption and the burden on the battery consumption.

Hereinabove, the present invention has been described with reference to exemplary embodiments thereof. It will be understood by those skilled in the art to which the present invention pertains that the present invention may be implemented in a modified form without departing from essential characteristics of the present invention. Therefore, the exemplary embodiments disclosed herein should be considered in an illustrative aspect rather than a restrictive aspect. The scope of the present invention should be defined by the following claims rather than the above-mentioned description, and all technical spirits equivalent to the following claims should be interpreted as being included in the present invention.

What is claimed is:

1. An interface conversion device communicating between a processor and a smartcard IC chip, comprising:
    an input/output signal conversion logic configured to transfer a signal between a first interface of the processor and a second interface of the smartcard IC chip according to a determination of a logical value of an input signal to the input/output signal conversion logic connected to the first interface and the second interface;
    a clock generator configured to generate a clock signal driving the smartcard IC chip depending on a first control signal received from the processor and provide the generated clock signal to the smartcard IC chip; and
    a reset controller configured to generate a reset signal depending on a second control signal received from the processor and provide the generated reset signal to the smartcard IC chip,
    wherein the processor controls operation of the smartcard IC chip according to the logical value, the first control signal and the second control signal,
    wherein the input/output signal conversion logic includes an input terminal and an output terminal connected to the first interface of the processor and an input/output common terminal connected to the second interface of the smartcard IC chip, and wherein the input/output signal conversion logic keeps a logical value of the input terminal and the output terminal connected to the first interface of the processor and a logical value of the input/output common terminal connected to the second interface of the smartcard IC chip in '1' and when the logical value of the terminal connected to any one of the interfaces is '0', transfers the logical value to the terminal connected to the other interface.

2. The interface conversion device of claim 1, wherein the first interface is a full-duplex universal asynchronous receiver transmitter interface.

3. The interface conversion device of claim 1, wherein the second interface is a half-duplex asynchronous receiver transmitter interface.

4. The interface conversion device of claim 1, wherein the first control signal and the second control signal are received through a universal input/output signal line of the processor.

5. The interface conversion device of claim 1, wherein the clock generator is activated or inactivated depending on the first control signal.

6. The interface conversion device of claim 1, wherein the clock signal generated by the clock generator is provided as a reference clock of the input/output signal conversion logic.

7. The interface conversion device of claim 1, wherein the processor controls the smartcard IC chip using the first control signal and the second control signal.

8. The interface conversion device of claim 1, wherein the input/output signal conversion logic outputs the logical value '0' to the input/output common terminal connected to the second interface of the smartcard IC chip when the logical value '0' is input to the input terminal connected to the first interface of the processor and outputs a logical value 'Z' state to the input/output common terminal connected to the second interface when the logical value '1' is input to the input terminal connected to the first interface.

9. The interface conversion device of claim 1, wherein the input/output signal conversion logic outputs the logical value '1' to the output terminal connected to the first interface of the processor when the logical value of the input/output common terminal connected to the second interface of the smartcard IC chip is '1'.

10. The interface conversion device of claim 1, wherein the input/output signal conversion logic tests the logical value of the input terminal connected to the first interface when the logical value of the input/output common terminal connected to the second interface of the smartcard IC chip is '0', outputs the logical value '1' to the output terminal connected to the first interface when the logical value of the input terminal is '0', and outputs the logical value '0' to the output terminal connected to the first interface when the logical value of the input terminal is '1'.

11. A method for transferring a data signal between a full-duplex first interface and a half-duplex second interface, the method comprising:

outputting a logical value '0' to an input/output common terminal connected to the second interface when a logical value '0' is input to an input terminal connected to the first interface; and outputting a logical value 'Z' state to the input/output common terminal connected to the second interface when a logical value '1' is input to the input terminal connected to the first interface.

12. The method of claim 11, further comprising:

outputting the logical value '1' to an output terminal connected to the first interface of the processor when the logical value of the input/output common terminal connected to the second interface is '1'.

13. The method of claim 11, further comprising:

testing the logical value of the input terminal connected to the first interface when the logical value of the input/output common terminal connected to the second interface is '0';

outputting the logical value '1' to the output terminal connected to the first interface when the logical value of the input terminal is '0'; and outputting the logical value '0' to the output terminal connected to the first interface when the logical value of the input terminal is '1'.

* * * * *